United States Patent Office 3,210,255
Patented Oct. 5, 1965

3,210,255
MANUFACTURE OF NUCLEAR REACTOR FUEL ELEMENTS
William Fairhurst, Leyland, Preston, England, assignor to United Kingdom Atomic Energy Authority, London, England
No Drawing. Filed Dec. 6, 1961, Ser. No. 157,570
Claims priority, application Great Britain, Dec. 8, 1960, 42,231/60
7 Claims. (Cl. 176—67)

This invention relates to nuclear reactors and in particular to that kind of nuclear reactor fuel element which comprises a fuel member of uranium metal or uranium base alloy enclosed in a sheath of magnesium base alloy intended to protect the fuel member against oxidation and to retain fission products produced on irradiation of the fuel.

To prevent relative movement between the fuel member and its sheath occurring on thermal cycling during operation, it is known to equip the fuel member with a plurality of circumferential grooves and as a step in the manufacture of the fuel element to heat the assembly of the fuel member and sheath and to apply pressure to the sheath to cause it to deform into the grooves and thereby key the sheath to the fuel member. Pressure can either be applied by gaseous or hydraulic means. However, an important factor in fuel element performance is grain size and stability thereof and in the manufacture of the sheath it is considered most desirable to subject the sheath inter alia to cold working to assist in ensuring fine grain size. For example, in the case of fine-pitch helically finned sheaths, the fins may be produced by fin-rolling a thick-walled tubular body of the sheath material with employment of a mandrel, and such fin-rolling subjects the sheath material to cold working. In the case of coarse-pitch helically finned sheaths, production may be by impact extrusion, which provides longitudinal fins, followed by twisting to transform the fins to helical form. The twisting step subjects the sheath material to cold working. It is important during the pressurizing step not to lose the value of this cold working by subjection to excessive temperature which would encourage uncontrolled grain growth. At the comparatively low temperatures (around 250° C.) necessary for preventing grain growth, the pressure needing to be employed to produce the desired bonding requires to be large (of the order of 12,000 lbs./sq. inch) to offset the effect of the higher strength at these lower temperatures. This means that in practice hydraulic pressurizing is preferred to gas pressurizing, because of the danger involved in the use of gas at these pressures.

According to the invention, in the process of manufacture of a nuclear reactor fuel element from a fuel member of uranium or uranium base alloy and a magnesium base alloy sheath of fine grain size, the manufacture includes the steps of pressurizing the sheath, at a temperature such that uncontrolled grain growth of the material of the sheath does not occur, into grooves in the fuel member for preventing relative longitudinal movement between the fuel member and the sheath, allowing the assembly to cool, and annealing the assembly at a temperature substantially above the temperature range at which the fuel element is intended to operate so as to effect recrystallization of the material of the sheath to a structure such that in the said temperature range the sheath of the fuel element possesses those metallurgical properties of grain size and stability thereof which favour its integrity during prolonged operation.

Where the fuel element is intended to operate in the high temperature regions of a nuclear reactor, the manufacture preferably includes the steps of pressurizing the sheath, at a temperature such that uncontrolled grain growth does not occur, into grooves in the fuel member for preventing relative longitudinal movement between the fuel member and the sheath, allowing the assembly to cool, and annealing the assembly at a temperature substantially above the temperature range of 350°–470° C. at which the fuel element is intended to operate so as to effect recrystallization of the material of the sheath to a structure which is relatively stable in grain size at the operating temperature range 350–470° C., whereby the formation of a large grain structure favorable to leak paths is discouraged.

It will be appreciated that the method according to the invention is intended to prolong the useful life of a fuel element under irradiation in a nuclear reactor.

The invention also envisages a gas-cooled graphite moderated nuclear reactor having fuel elements whose mode of manufacture has been determined by the operating temperature range of the core region for which the elements are intended.

It will be appreciated that the temperature range quoted corresponds to conditions which occur during normal operation in the hotter regions of the core of a nuclear reactor, for example a nuclear reactor of the British civil power generating type such as Bradwell, Berkeley, etc.

A typical example of the application of the method according to the invention to the manufacture of a nuclear reactor fuel element will now be described. The fuel member consists of a uranium rod produced by vacuum casting, having had Fe and Al additions (see British patent specification No. 863,492) made to it prior to casting, and having undergone after casting a heat treatment comprising heating to 750° C., quenching with water, annealing in argon at 550° C. for one hour followed by cooling to room temperature (see British patent specifications Nos. 812,123 and 806,971). The fuel member has circumferential grooves of about .02″ depth machined in it and is subsequently enclosed within a protective sheath of the magnesium base alloy formerly known as Magnox A12 and now known as Magnox AL80 (0.8% Al, .01% Be, remainder Mg). If the sheath has been subjected to cold working during its production, it is preferably subjected, prior to assembly with the fuel member, to an anneal at 500° C. for 20 minutes, but this step is not essential. The assembly of fuel rod and sheath is subjected to oil pressurizing, for example employing equipment described on page 106 of "Nuclear Power," vol. 4, No. 35 (March 1959), by preheating in oil at 250° C. and 100 lbs./sq. inch pressure for 15 minutes, the pressure then being raised to 12,000 lbs./sq. inch and maintained for 30 minutes so as to pressurize the material of the sheath into the grooves in the fuel member and thereby key the sheath and fuel member together. The pressure is then released and the assembly is removed from the oil to cool in air.

After cooling, the assembly is subjected to a temperature anneal by being supported vertically in a furnace in an atmosphere of $CO_2$ at 200 lbs./sq. inch and at a temperature of 515° C.±10° C. for 120 minutes, subsequently being allowed to cool to room temperature. This produces recrystallization to an extent dependent on whether or not the sheath has been annealed before assembly, as referred to above. By virtue of the fact that the intended operating temperature range of 350–470° C. is substantially below the anneal temperature of 515°±10° C., grain size is relatively stable in the operating range and the fuel element is expected to have its useful life prolonged as a result of the sequence of steps herein set forth, because formation of a large grain structure favourable to leak paths extending through the wall of the sheath is discouraged.

Fuel elements prepared for the 350–470° C. regions of a reactor are clearly marked to ensure that they are charged into that region of the reactor core in which their mode of production best fits them to operate and are not confused with fuel elements intended for the cooler regions of the reactor.

The following are results of measurements of grain size of complete sheaths after production of fuel elements and after 1000 hour annealing tests at 400° C. and 450° C., the treatment designated "A" being a step in the manufacture of fuel elements for the cooler regions of a nuclear reactor where the operating temperature is in the range 140°–350° C. (such manufacture being described and claimed in the co-pending application Serial No. 157,542 of the same date as this application, the applicants being T. J. Heal and I. H. Morrison), the treatment designated "B" being inserted by way of comparison, and the treatments designated "C" and "D" being steps in the method herein described:

| Test: No. of sheaths examined (A and B) | "A" Hydraulic Press'n and Anneal. at 390° C. | | "B" Gas Press'n for 8 hrs. at 515° C. | |
|---|---|---|---|---|
| | Grain size, units of 0.001″ | | Grain size, units of 0.001″ | |
| | Average | Maximum | Average | Maximum |
| As produced, A=12, B=6 | 6 | 21 | 36 | 276 |
| 1,000 hrs. at 400° C., A=11, B=5 | 32 | 270 | 30 | 86 |
| 1,000 hrs. at 450° C., A=8, B=5 | 167 | 509 | 55 | 174 |

| Test: No. of sheaths examined (C and D) | "C" Hydraulic Press'n and Anneal. at 515° C. | | "D" Preannealed at 500° C.; Hydraulic Press'n and Anneal. at 515° C. | |
|---|---|---|---|---|
| | Grain size, units of 0.001″ | | Grain size, units of 0.001″ | |
| | Average | Maximum | Average | Maximum |
| As produced, C=6, D=10 | 61 | 202 | 28 | 134 |
| 1,000 hrs. at 400° C., C=2, D=3 | 20 | 188 | 38 | 143 |
| 1,000 hrs. at 450° C., C=2, D=3 | 55 | 154 | 33 | 133 |

The results show that fuel elements treated according to "C" and "D" have a sheath structure which is considerably more stable than that of elements treated according to "A" in the temperature range 400–450° C. It will be noted, however, that the initial grain size of the sheaths of fuel elements treated according to "C" and "D" is too coarse for operation in the cooler regions of a reactor, since experience indicates that a reasonable standard for grain size to minimize cavitation failure is 0.007″ average, 0.020″ maximum. The results indicate that ultimate grain size of the sheaths of fuel elements treated according to "C" and "D" after service at temperatures above 350° C. will be much less variable and will have a finer maximum grain size than the sheaths of fuel elements treated according to "A." The results also indicate that fuel elements treated according to "A" are better equipped, by virtue of the smaller grain size of their sheaths, for service in the cooler regions of the reactor.

The term "uranium base alloy" where employed herein is intended to cover known alloys of uranium with small quantities, up to a total of 10%, of alloying ingredients such as iron, aluminium, niobium, titanium, zirconium, molybdenum and chromium, which improve the resistance of the alloy to growth or deformation under neutron irradiation without undue penalty of high neutron capture cross-section.

I claim:

1. In the process of manufacture of a nuclear reactor fuel element from a fuel member selected from the group consisting of uranium and uranium base alloy, and a magnesium base alloy sheath of fine grain size, the steps of pressurizing the sheath, at a temperature such that uncontrolled grain growth of the material of the sheath does not occur, into keying contact with the fuel member for preventing relative longitudinal movement between the fuel member and the sheath, allowing the assembly to cool, and annealing the assembly at a temperature substantially above the temperature range of 350°–470° C. at which the fuel element is intended to operate so as to effect recrystallization of the material of the sheath to a structure which is relatively stable in grain size in the said temperature range, whereby the formation of a large grain structure favorable to leak paths is discouraged, for imparting to the fuel element integrity of sheath during prolonged operation.

2. A process, according to claim 1, for manufacture of a fuel element intended to operate in the temperature range 350°–470° C., wherein pressurizing is effected at a temperature in the region of 250° C. and subsequent annealing is effected at about 515° C.±10° C.

3. A process according to claim 1, wherein the magnesium-base alloy sheath is subjected to cold working during its production for providing it with a fine grain structure.

4. A process according to claim 3, wherein, prior to assembly with the fuel member and subsequent pressurizing, cooling and annealing, the sheath, having been cold worked during its production, is pre-annealed at about 500° C.

5. A nuclear reactor fuel element, intended for operation in the high temperature regions of 350°–470° C. of a nuclear reactor and comprising a fuel member selected from the groups consisting of uranium and uranium base alloy, and a magnesium base alloy sheath of fine grain size, wherein the manufacture of the fuel element includes the process steps set forth in claim 1.

6. A process of preparing a nuclear reactor fuel element comprising assembling a grooved uranium-containing fuel member in a tubular magnesium base alloy sheath, subjecting the sheath to a pressure of approximately 12,000 p.s.i. at a temperature of approximately 250° C. to pressurize the sheath into the grooves in said fuel member thereby keying the sheath to the fuel member, cooling the assembly, and annealing the cooled assembly at a temperature of approximately 515° C.

7. A process according to claim 6 wherein said sheath is cold worked and annealed at a temperature of approximately 500° C. prior to said assembly with the fuel member.

References Cited by the Examiner

UNITED STATES PATENTS 2,820,751  1/58  Saller.

FOREIGN PATENTS 553,970  4/57  Belgium.
875,466  8/61  Great Britain.
875,832  8/61  Great Britain.

OTHER REFERENCES

Nuclear Fuel Elements by Hausner et al., November 1959, pp. 153–155, Reinhold Publishing Co., New York.

CARL D. QUARFORTH, *Primary Examiner.*

OSCAR R. VERTIZ, *Examiner.*